US010392064B2

(12) United States Patent
Rossiter et al.

(10) Patent No.: US 10,392,064 B2
(45) Date of Patent: Aug. 27, 2019

(54) ASSEMBLY FOR STORING BICYCLES

(71) Applicant: PFL SPACES PTY LTD, Brisbane, Queensland (AU)

(72) Inventors: Mark Anthony Rossiter, Brisbane (AU); Justin Louis Sires, Brisbane (AU); Craig Oliver Hyde, Logan Village (AU)

(73) Assignee: PFL SPACES PTY LTD, Brisbane, Queensland (AU)

( * ) Notice: Subject to any disclaimer, the term of this patent is extended or adjusted under 35 U.S.C. 154(b) by 0 days.

(21) Appl. No.: 15/560,536

(22) PCT Filed: Apr. 21, 2016

(86) PCT No.: PCT/AU2016/050289
§ 371 (c)(1),
(2) Date: Sep. 22, 2017

(87) PCT Pub. No.: WO2016/168896
PCT Pub. Date: Oct. 27, 2016

(65) Prior Publication Data

US 2018/0111651 A1 Apr. 26, 2018

(30) Foreign Application Priority Data

Apr. 22, 2015 (AU) ................................ 2015202045

(51) Int. Cl.
*B62H 3/12* (2006.01)
*B62H 3/02* (2006.01)

(52) U.S. Cl.
CPC ................ *B62H 3/12* (2013.01); *B62H 3/02* (2013.01)

(58) Field of Classification Search
CPC ... B62H 3/00; B62H 3/02; B62H 3/04; B62H 3/08; B62H 3/12; B60R 9/10
(Continued)

(56) References Cited

U.S. PATENT DOCUMENTS 574,629 A * 1/1897 Phillips .................... B62H 3/12 211/17
579,584 A * 3/1897 Jessup ...................... B62H 3/12 211/17
(Continued)

FOREIGN PATENT DOCUMENTS

JP H05221355 8/1993
JP H06199256 7/1994
(Continued)

OTHER PUBLICATIONS

International Search Report and Written Opinion for International Application No. PCT/AU2016/050289, dated Jun. 29, 2016, 11 pages.

*Primary Examiner* — Patrick D Hawn
(74) *Attorney, Agent, or Firm* — Michael Best & Friedrich LLP

(57) ABSTRACT

The present invention relates to an assembly for storing bicycles, the assembly including: at least one fixed rail; and a support frame on which at least one bicycle can be loaded in an elevated position above the ground, wherein the support frame is moveable on the rail between a forward advance position for loaded and unloading the bicycle from the support frame, and a rearward retracted position for storing the bicycle. When the support frame is in the forward advanced position, a bicycle loaded onto the support frame can be locked to the support frame using a conventional bicycle lock.

17 Claims, 6 Drawing Sheets

(58) Field of Classification Search
USPC ........................................................ 211/17–24
See application file for complete search history.

(56) References Cited

U.S. PATENT DOCUMENTS

| | | | | | |
|---|---|---|---|---|---|
| 595,967 | A * | 12/1897 | Parsons | B60P 3/073 | 410/3 |
| 3,872,972 | A * | 3/1975 | Cummins | B62H 3/02 | 211/117 |
| 3,924,751 | A * | 12/1975 | Ballenger | B62H 3/12 | 211/117 |
| 3,931,919 | A * | 1/1976 | Gerber | B60R 9/10 | 224/324 |
| 5,377,886 | A * | 1/1995 | Sickler | B60R 9/10 | 224/521 |
| 5,497,927 | A * | 3/1996 | Peterson | B60R 9/06 | 224/519 |
| 5,505,579 | A * | 4/1996 | Ray | B60P 3/1025 | 224/310 |
| 5,549,231 | A * | 8/1996 | Fletcher | B60R 9/06 | 211/19 |
| 5,690,259 | A * | 11/1997 | Montani | B60R 9/042 | 224/310 |
| 5,803,774 | A * | 9/1998 | White | B63H 21/175 | 114/61.12 |
| 5,845,788 | A * | 12/1998 | Robolin | A47F 3/08 | 211/17 |
| 6,336,562 | B1 * | 1/2002 | Mori | B62H 3/08 | 211/162 |
| 6,637,602 | B2 * | 10/2003 | Dueck | A47F 7/00 | 211/17 |
| 7,481,027 | B2 * | 1/2009 | Blume | B62H 3/04 | 211/17 |
| 7,694,830 | B1 * | 4/2010 | Larson | B62H 3/08 | 211/20 |
| 7,922,009 | B1 * | 4/2011 | Larson | B62H 3/08 | 211/17 |
| 7,946,432 | B1 * | 5/2011 | Swanson | B62H 3/12 | 211/20 |
| 8,468,745 | B2 * | 6/2013 | Krause | B62H 3/00 | 211/117 |
| 8,950,592 | B1 * | 2/2015 | Greenblatt | B62H 3/12 | 211/17 |
| 9,278,721 | B2 * | 3/2016 | Blume | B62H 3/04 | |
| 10,040,497 | B2 * | 8/2018 | Hyde | B62H 3/04 | |
| 2003/0141263 | A1 * | 7/2003 | Dueck | A47F 7/00 | 211/17 |
| 2005/0284036 | A1 * | 12/2005 | Blume | B62H 3/00 | 52/79.4 |
| 2007/0107322 | A1 * | 5/2007 | Blume | B62H 3/04 | 52/79.4 |
| 2013/0327802 | A1 * | 12/2013 | Hammond | B60R 9/06 | 224/519 |

FOREIGN PATENT DOCUMENTS

| | | |
|---|---|---|
| KR | 20110019005 | 2/2011 |
| KR | 20110056255 | 5/2011 |

* cited by examiner

ASSEMBLY FOR STORING BICYCLES

FIELD OF THE INVENTION

The present invention relates to an assembly for storing bicycles and an installation comprising a series of the assemblies.

BACKGROUND OF THE INVENTION

There are a range of different racks available for storing bicycles. One type of rack includes semi-circular or arch structures projecting from the ground at approximately the same height as the frame of the bicycle. Bicycles can then be locked to the structures with both wheels on the ground. Another type of rack includes pairs of small arches that are spaced apart to allow a wheel of the bicycle to be positioned between the arches, and thereby assist in holding the bicycle upright. The wheel or the frame of the bicycle can then be locked to the arches. Both of these types of racks may not be suitable when limited space is available.

There are also bicycle racks available for storing bicycles off the ground where limited space is available. Typically, off the ground storage racks include hooks that engage the wheel rim, or pairs of arms that engage the horizontal bar of the bicycle frame between the seat post and the handle bars (or the goose neck of the handle bars). Typically, the hooks and arms are anchored to the wall or ceiling of a storage shed or shelter and the bicycle is lifted into position on the rack.

It is an object of the present invention to provide an alternative assembly for storing bicycles.

SUMMARY OF THE INVENTION

The present invention relates to an assembly for storing at least one bicycle, the assembly including:

at least one fixed rail; and a support frame on which at least one bicycle can be loaded in an elevated position above the ground, wherein the support frame is moveable on the rail between a forward advanced position for loaded and unloading the bicycle from the support frame, and a rearward retracted position for storing the bicycle, and the support frame is configured so as to protrude beyond the rail when the support frame is located in the forward advanced position which facilitates a user loading the bicycle onto the support frame without obstruction from the rail.

The support frame may also be configured so that when in the rearward retracted position, the bicycle loaded onto the support frame is located at least partly alongside the rail.

When in the forward advanced position, ideally the support frame can protrude beyond the rail by a first distance that may be any suitable length. Suitably, the first distance is ideally at least half the length of the bicycle that can be loaded onto the support frame. Even more suitably, the first distance may be approximately the length between a seat post and handle bars of the bicycle. The first distance may also be at least equal to the length from the back of a rear wheel to the stem of the goose neck. The first distance may also be at least equal to the length from the front of the front wheel to the seat post. The first distance may also be substantially equal to the total length of a bicycle for an adult. In one example, the first distance may be in the range of 150 to 200 cm, and suitably in the range of 160 to 190 cm.

The support frame can move by a second distance between the forward advanced position and the retracted position along the rail in which the second distance ranges from at least half the length of the bicycle that can be stored on the assembly. Suitably, the second distance is at least equal to the first distance, and suitably in the range of 20 to 100 cm greater than the first distance.

Suitably, when the support frame is located in the rearward retracted position, the entire bicycle located in the support frame can be positioned rearwardly of a front end of the rail.

The support frame may include a carriage that is arranged to travel along the rail and the support frame has a forward portion forward of the carriage on which the bicycles are supported. The forward portion of the support frame may include a cantilever member extending from the carriage, in which one end of the cantilever member extends from the carriage, and the other end being free so as protrude beyond the rail by the first distance.

The carriage may include at least two wheels for engaging an upper face of the rail, and at least one bottom wheel for engaging a lower face of the rail. The wheels may be of any suitable form include bearings, rollers, disks wheels, castors and so forth, and may have any suitable profile to minimize lateral movement to the rail.

The support frame may be configured so that the at least one bicycle loaded onto the support frame may be supported in an upright orientation or an inclined orientation. Ideally, the bicycle loaded onto the support frame may be supported in a horizontal orientation in which the wheels of the bicycle are substantially level. When in the horizontal orientation, the bicycle can be positioned parallel to the ground or at an acute angle to the ground, for example in the range up to 20 or 30 degrees to horizontal.

The forward portion of the support frame may include support brackets, on which at least one of the bicycles can be loaded in a stable condition, and suitably the support brackets are arranged on the cantilever member.

While it is possible that a bicycle can be loaded onto one side of the support frame only, ideally, the support brackets are arrange on opposite sides of support frame and to allow bicycles to be loaded on each side thereof and on opposite sides of the rail.

The support brackets may include arms that are arranged to engage spaced sections of the bicycle.

Ideally, the support frame includes support brackets on opposite sides of a forward end thereof and support brackets on opposite sides of a rear end thereof, and in which the support brackets at the forward end are at different heights to each other, and the support brackets at the rear end are at different heights to each other. The advantage provided by this features is that the handle bars of the bicycles loaded onto the opposite sides are less likely to clash.

The support brackets may include first support brackets adapted to support the handle bars of the bicycle. Specifically, the first support bracket may include a first pair of arms that are spaced apart so that the stem of a goose neck of a bicycle or the frame of the bicycle below the handle bars can be located between the arms.

The support frame may include second support brackets adapted to support the seat of the bicycle. Specifically, the second support brackets may include a second pair of arms that are spaced apart so that a seat post can be received between the arms.

Ideally, the first support brackets and the second support brackets are arranged at different heights to which the handle bars are supported above the seat of each bicycle.

The first support brackets may be adapted to support the handle bars of the at least one bicycle above the rail. The first support bracket may be arranged so that the handle bars supported by the first support bracket can at least partially overhang the rail.

The second support bracket may be adapted to support the seat of the bicycle below the handle bars that are being supported by the first support brackets. For example, the second bracket may align approximately with the rail, or below the rail.

It is also possible that the first support bracket could be adapted to support the handle bars of the bicycle below the rail.

The support brackets may also be arranged so that the at least one bicycle can be loaded with the front wheel to the rear end of the support frame, i.e., nose in first, or with the rear wheel to the rear end of the support frame, i.e., tail in first. Ideally on one side of the support frame, the first support bracket for supporting the handle bars is located at or toward the rear end of the support frame and the second support frame for supporting the seat is located at or toward the front end of the support frame to allow the nose in first storage of the bicycle. Conversely on the other side of the support frame, the first support bracket for supporting the handle bars is located at or toward the front end of the support frame and the second support frame for supporting the seat is located at or toward the rear end of the support frame to allow the tail in first storage of the bicycle. In other words, on one side of the cantilever member, the support brackets include a first support bracket adapted to support the handle bars of one of the bicycle at a rear end of the support frame, and second support bracket adapted to support the seat of the bicycle at a forward end of the support frame, and on an opposite of the cantilever member, the support brackets include a first support bracket adapted to support the handle bars of another of the bicycles at a forward end of the support frame, and the second support bracket is adapted to support the seat of the bicycle at a rear end of the support frame, the support brackets thereby enabling bicycles to be located on opposite sides of the cantilever member in a nose to tail relationship to each other.

The first and second support brackets may each include one pair of arms that are spaced to receive therebetween: i) either the seat post to allow an underside of the seat to be rested in the arms, or ii) a stem of a goose neck of the bicycle to allow the handle bars to rest on the arms. A benefit of having the arms located on either side of the goose neck is that the handle bars rest in the arms, which in turn helps to hold the handle bars in a stable condition with the front wheel of the bicycle align with the frame of the bicycle.

Suitably, the arms of the respective support bracket, being either the first support bracket or the second support bracket, located at the rear end of the support frame may have a forward facing opening. As described herein the support bracket at the rear end of the support frame may be the first support bracket for receiving the stem of the handle bars on one side of the support frame, and the second support bracket for receiving the post of the seat on the other side of support frame.

In one embodiment, the arms of the respective support brackets located toward the front end of the support frame may be forward facing. The arms that are forward facing extend in a direction substantially parallel to the rail and define a forward facing opening between the arms.

In another embodiment, the arms of the respective support brackets located toward the front end of the support frame may be laterally facing. The arms that are laterally facing extend in a direction substantially lateral to the rail and define an opening that is substantially lateral to the rail.

The support frame may be arranged so that bicycles loaded thereon move in an orientation parallel to the direction of movement of the support frame along the rail.

The support frame may also include a handle at a forward end of the support frame. The handle may extend upwardly of the rail to assist in moving the support frame by hand between the forward advance and the rearward retracted positions. In one embodiment, the handle may project forwardly of the rail when the support frame is in the rear retracted position.

The assembly may include an arrester, such as a brake, that can operate to prevent the support frame from moving along the rail. The arrester may include a latch device that is operable to lock the support frame in either one or a combination of: i) the forward advanced position to facilitate bicycles being loaded onto the assembly, and/or ii) the rearward retracted position to retain the position of the bicycles while being stored.

In an embodiment, the rail can be mounted to any object, such as an existing wall or the ground.

In another embodiment, the assembly may include at least one upwardly extending post that can be anchored to the ground and to which the rail can be mounted in a predetermined spacing above the ground. For example, the rail may be at a height in the range of the 80 to 140 cm above the ground, and suitably in the range of 90 to 110 cm above the ground.

The or each post may be located at any position along the length of the rail, including centrally located. Suitably however, the assembly includes one post only that is located at a rear end of the rail.

The assembly may also include a bracing element that extends at an angle between the post and the ground for bracing the post against movement.

The post and bracing element may include any suitable foundation.

In an embodiment, the assembly includes a plurality of the rails, each rail having one of the support frames described herein, wherein the rails are arranged side-by-side and adjacent rails are located at different heights. Suitably, the assembly includes a line of the rails that are located at alternating heights. The benefit provided by this aspect of the invention is that the handle bars and peddles of bicycles loaded onto adjacent support frames are less likely to clash. The spacing between adjacent rails is preferably in the range of 30 to 60 cm, and suitably in a range from 35 to 45 cm above the ground.

In an embodiment, the assembly includes a plurality of the rails each having the support frames moveably mounted thereon, wherein a forward end of adjacent rails are offset relative to each other.

The present invention also relates to an installation including the assembly described herein having a plurality of the rails each having the support assembly thereon, wherein the rails are arranged in series in which the rear and forward aspects align.

The rails at either one or both ends of the series may be located adjacent to an obstacle. The space between the rails may be in the range of 30 to 60 cm, and suitably in a range from 35 to 45 cm.

BRIEF DESCRIPTION OF THE DRAWINGS

A preferred embodiment of the present invention will now be described with reference to the accompanying figures, of which.

DETAILED DESCRIPTION

Figure 1A:
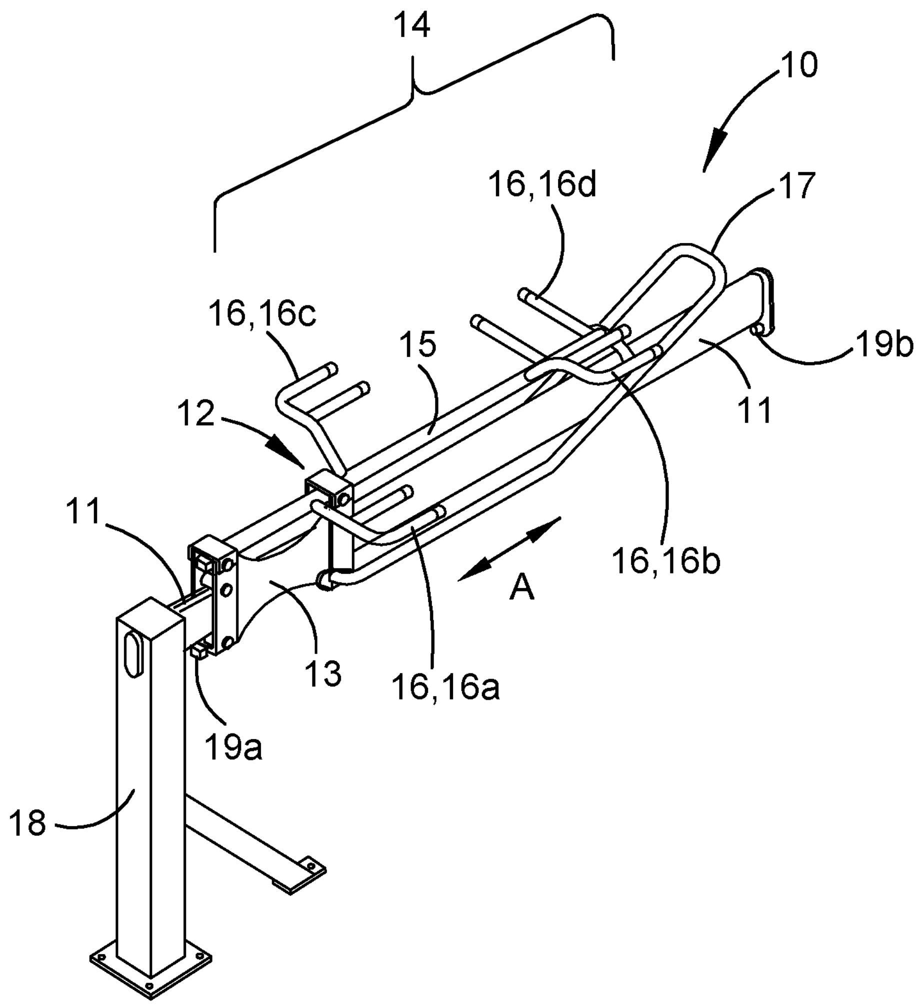
FIGS. 1A and 1B illustrate an assembly for storing bicycles comprising a rail and a support frame that is movable along the rail and in particular is movable between a rearward retracted position in which bicycles are stored on the support frame, and a forward advanced position for loading and unloading bicycles from the support frame, the support frame having arms for supporting bicycles in a stored position.

A preferred embodiment of the present invention will now be described in the following text with reference to the accompanying figures, in which reference numerals included in the text have been used to help identify the corresponding features in the figures. In order to maintain clarity for the figures, not all of the reference numerals have been included in each of the figures.

Figure 1B:
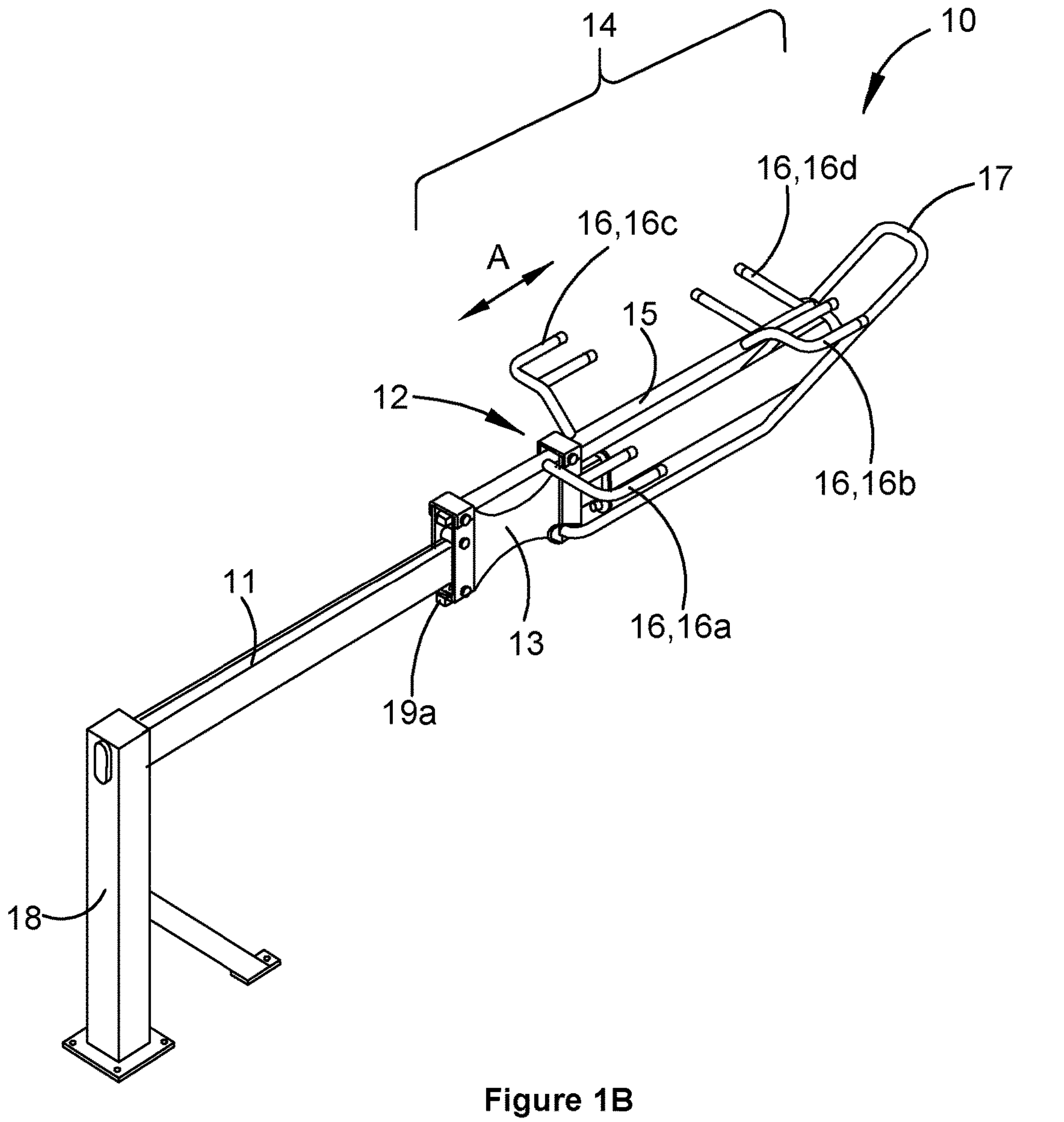
Figure 1C:
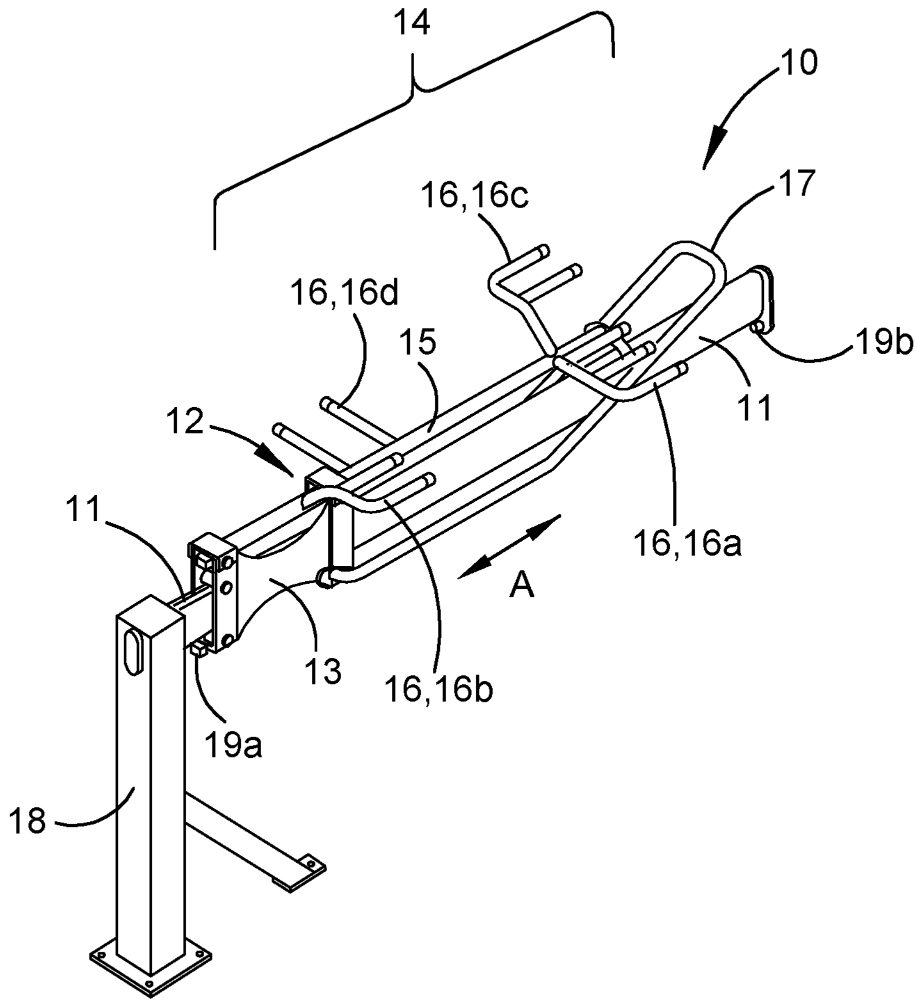
FIG. 1C illustrates the assembly for storing bicycles shown FIG. 1A in which the arms for supporting the bicycles have been located in a different position.

With reference to the accompanying drawings, the assembly 10 includes a linear rail 11 mounted in a horizontal orientation and a support frame 12 having a carriage 13 and a forward portion 14 including a cantilever member 15 that extends from the carriage 13. The support frame 12 is specifically adapted to allow one or more bicycles (not shown in the figures), and suitably one bicycle on each side of the support frame 12, to be loaded onto the support frame 12 in an elevated position above the ground. The support frame 12 can be moved in the direction of arrow A, between an forward advanced position on the rail 11 as shown in FIG. 1B, in which the forward portion 14 of the support frame extends beyond the rail 11 to facilitate a user loading their bicycle onto the support frame 12, and a reward retracted position, as shown in FIG. 1A, in which the bicycle is stored adjacent to the rail 11. Although not shown in the Figures, the rail 11 may be located closely adjacent to a wall, under a low ceiling, or located adjacent to another rail or some other obstruction.

For example, the rail 11 may be located in a range from 40 to 60 centimeters to another obstruction and with the support frame 12 being moveable between the rearward retracted position and the forward advanced position, the support frame 12 can be moved clear of the obstruction when in the forward advanced position so that a user can more easily load and unload bicycles from the assembly 10. In other words, the assembly 10 can allow restricted space to be utilized to store bicycles at a high density, yet the bicycles can be parked and retrieved from the assembly in an easy and convenient manner with a low risk of damaging the bicycles.

The forward portion 14 of the support frame 12 may extend forward of the rail 11 when in the forward advanced position by a distance at least half the length of a bicycle, and suitably by a length equal to or greater than either: i) from the back of a rear wheel of the bicycle to the goose neck stem of the handle bars; or ii) from the front wheel of the bicycle to the seat post of the bicycle. Ideally, the forward portion 14 of the support frame 12 can extend forward of the rail 11 by a distance at least equal to the length of the bicycle. With the forward portion 14 extending forward of the rail 11 by this amount, a bicycle can be loaded onto the support frame 12 by either forward loading in which the bicycle is orientated nose first on the support frame 12, or with rearward loading in which the bicycle is oriented tail first on the support frame 12. When the forward portion 14 is in the forward advanced position, a bicycle loaded onto the support frame 12 can be locked to the support frame 12 using a conventional bicycle lock (not shown).

The cantilever member 15 of the support frame 12 may extend from the carriage 13 in a direction parallel with the rail 11, and brackets 16 extend outwardly from either side of the cantilever member 15. The brackets 16 on either side at a forward end of the support frame 12 are ideally located at different heights. Similarly, the brackets 16 at either side at the rear end of the support frame 12 are ideally located at different heights. By way of example, the brackets 16 on either side of the forward portion 14 may be displaced in height by at least 10 cm, and suitably in the range of 10 to 15 cm.

It will be appreciated that the displacement between the brackets 16 helps to minimize clashes between the handle bars and peddles of bicycles loaded onto opposite sides of the assembly 10.

The brackets 16 may have any suitable formation, for example, for engaging the rim of a wheel, or the frame. The main criteria is that the brackets have a formation that allows the bicycle to be readily loaded and unload, and when loaded the bicycle is held in the stable condition.

Figure 2:
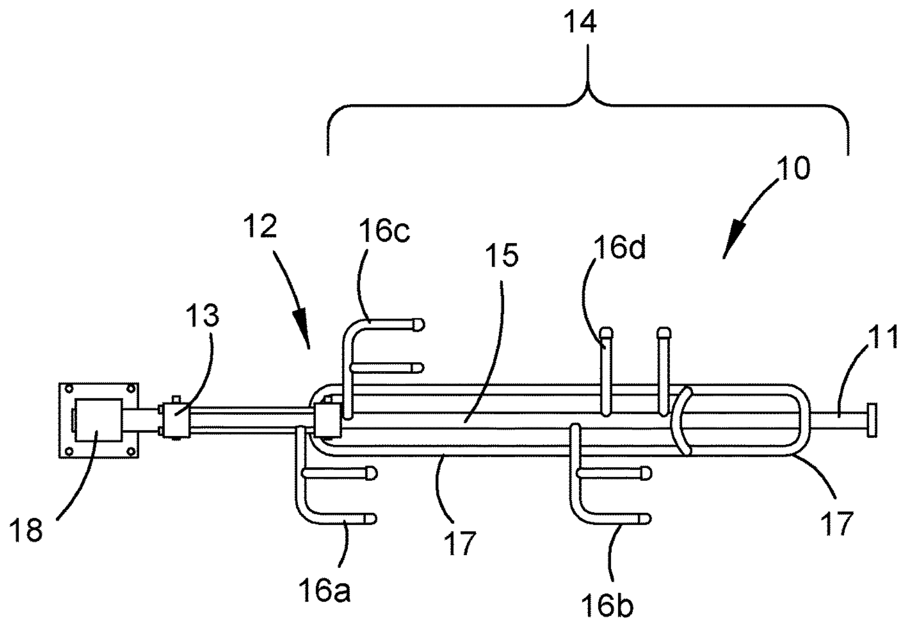
FIG. 2 is a side view of the assembly located in the rearward retracted position shown in FIG. 1A.
Figure 3:
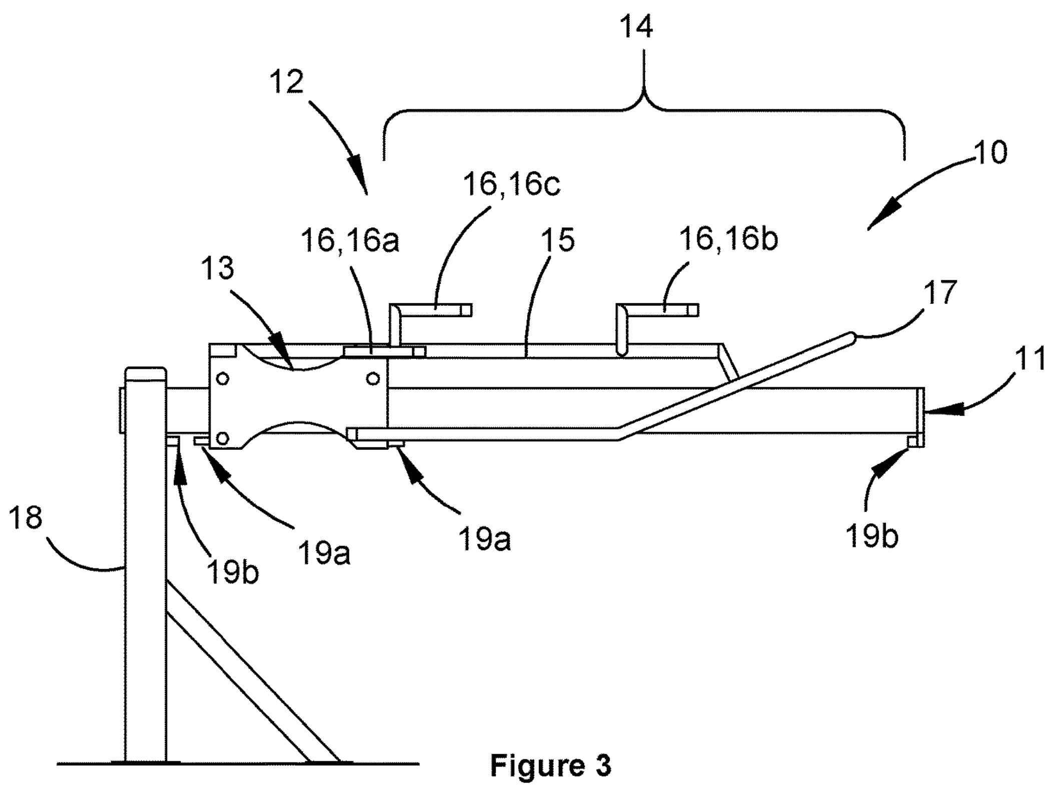
FIG. 3 is a plan view of the assembly located in the rearward retracted position.

Each bracket 16 ideally has a pair of spaced apart arms so that either the seat post or the stem of the goose neck can be received between the arms. The arms may have any suitable length, for example, in the range of 100 mm to 200 mm and ideally 150 mm. The arms may also be spaced at any suitable spacing, for example in the range of 100 mm to 200 mm and ideally 150 mm. As can be seen, the arms may be configured to have a forward facing opening, or have an opening that faces laterally to the axis of the cantilever member 15. The two brackets 16*a*, 16*b* on the left-hand-side of the assembly 10 shown in FIG. 2 have forwardly facing openings and are specifically adapted to allow a bicycle to be wheeled backward (tail first) onto the support frame 12 with the seat post being received by the rearward pair of arms 16*a* and the stem of the goose neck of the handle bars being received by the forward pair of arms 16*b*. Conversely, the two pairs of arms 16*c*, 16*d* on the right-hand-side of the support assembly shown in FIG. 2 have a rear support bracket 16*c* that faces forwardly and a forward support bracket 16*d* that faces laterally to the rail. The brackets 16*c*, 16*d* on the right hand side are specifically arranged to allow a bicycle to be wheeled forwardly (nose first) onto the support frame 12 with the goose neck of the handle bars being received by the rearward pair of arms and the seat post by lifting the bicycle, aligning the seat post with the laterally facing opening of arms 16*a* and moving the bicycle sideways. The arms on the left hand side are specifically arranged to allow a bicycle to be loaded rear (tail) first in which the seat post is received by the rear bracket 16*a*, and the stem of the goose neck is received by the forward bracket 16*b*. In other words, the bicycles on opposite sides of the support frame are arranged nose to tail.

As can best be seen in FIGS. 1A and 1B, the brackets 16*c*, 16*b* for receiving the stem of the handle bars is arranged to support the handle bars above the rail 11, thereby allowing the handle bars to at least partially overhang rail 11. The brackets 16*a*, 16*d* for receiving the seat post is arranged to support the seat below the brackets 16*b*, 16*c* that receive the stem of the handle bars. In particular, the pairs of arms for receiving the seat post are arranged substantially in alignment with the rail.

The brackets 16 may be arranged on the cantilever member 15 such that when the support frame 12 is in the forward advanced position for loading bicycles, the brackets 16*b* and 16*d* will be located beyond the end of the rail 11. Similarly, the brackets 16*a* and 16*c* may be arranged on the cantilever member 15 so as to be located beyond the end of the rail 11 when the support frame 12 is in the forward advanced position. Alternatively, when the support frame 12 is in the forward advanced position, the brackets 16*a* and 15*c* may overlay or fall just inside the end of the rail 11.

It will be appreciated that the bicycle may need to be lifted by hand in order to located the bicycle into the support frame 12, and thereby locate the bicycle above the ground.

The carriage 13 of the support frame 12 includes a body having at least two upper wheels that are spaced longitudinally along the carriage 13, and at least one lower wheel, thereby preventing the carriage from moving upwardly and downwardly. Suitably, the carriage 13 also includes two wheels on the bottom of the carriage 13 spaced longitudinally along the carriage 13. Each wheel may have any suitable profile to complement the profile of the rail 11. The wheels can also have any suitable roller bearings to provide low friction movement of the carriage 13 along the rail 11.

The support frame 12 also includes a handle 17 for manually pushing and pulling the support frame 12. The handle 17 may be conveniently located above the rail 11, and ideally extends from the carriage 13.

As can be seen, the rail 11 is attached to an upright post 18 having a ground plate with holes for receiving anchors. The post 18 is located at a rearward end of the rail 11 and a bracing element extends at an angle of approximately 45 degrees to the post 18.

The assembly 10 may also include an arrester for preventing movement of the support frame along the rail when desired. The arrester may be any suitable brake. In the case of the preferred embodiment, the arrester includes latching elements 19*a* on the forward and rear faces of the body of the carriage 13 that engage with co-operating latching element 19*b* on the post and on an inner face of the end of the rail 11. The co-operating latching elements 19*a*, 19*b* comprise suitable female and male formations that inter-fit and lock the carriages in the forward advanced position and the rearward retracted position.

The assembly 10 may be constructed using any suitable materials including mild steel and with any suitable dimensions. By way of example only, the upper surface of the rail 11 may be located in the range of 85 to 95 cm above the ground, the length of the rail may be in the range of 180 to 200 cm, and the arms 16 of each support bracket may be in the range of 30 to 50 cm long, suitably approximately 35 cm.

Depending on the particular requirements of a bicycle storage facility, an installation may include multiple rails 11 in series each having a support frame 12 in which the rails 11 are located at alternative heights and the bicycles on each assembly are arranged in a nose-to-tail relationship, that is the brackets 16 are arranges so that the bicycles are arranged nose in first on one side of the rail 11 and tail in first on the other side of the rail 11. In addition, the brackets 16 can be arranged so that bicycles closest to each other on adjacent rails may be opposite oriented, with one bicycle loaded in a tail in first position and the closest bicycle of an adjacent rail 11 being loaded in a nose in the first position.

FIGS. 1A and 1B illustrate the left hand side of the assembly, denoted by arms 16*a* and 16*b*, being arranged to allow a bicycle to be loaded tail in first with the seat post being received by arms 16*a*. The right hand side of the assembly, denoted by arms 16*c* and 16*d*, being arranged to allow a bicycle to be loaded nose in the first with the handle bars being received by arms 16*c*.

FIG. 10 illustrates the arms 16 on the left hand side of the assembly 10, denoted by arms 16*a* and 16*b*, are arranged to allow a bicycle to be loaded nose in first with the handle bars being received by arms 16*b*. The arms 16 on the right hand side of the assembly 10, denoted by arms 16*c* and 16*d*, are arranged to allow a bicycle to be loaded tail in the first with the seat post being received by arms 16*d*. In the case of FIG. 10, it will be appreciated that the arms 16*d* may preferably be arranged to face forward. Moreover, it would be appreciated that the any one or combination of the arms 16*a*, 16*b*, 16*c* and 16*d* may be arranged to face forwardly or sidewardly, to the direction of movement denote by the arrow A, as desired.

Figure 4:
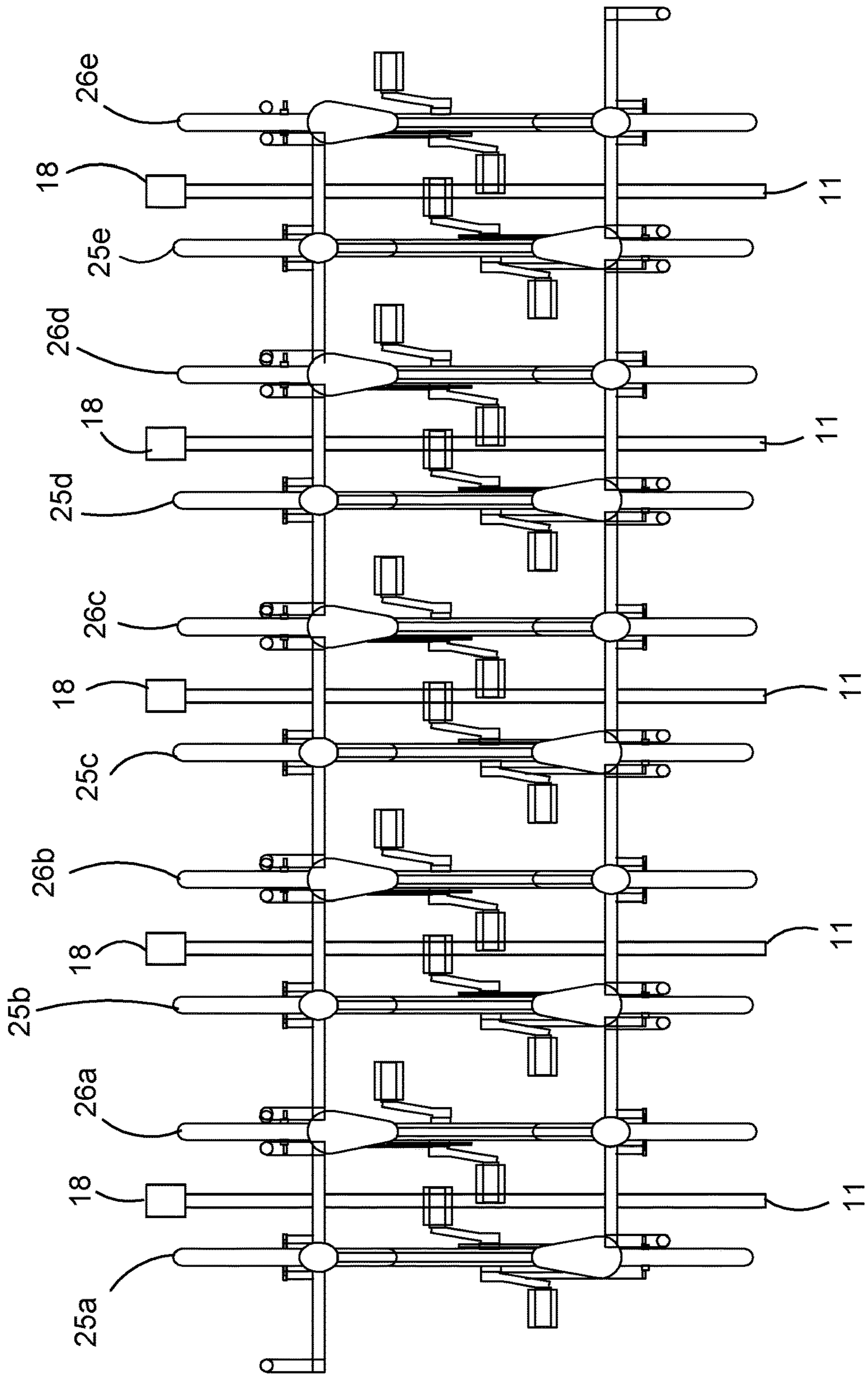
FIG. 4 is schematic plan view of an installation comprising five assemblies as shown in FIGS. 1 to 3, for storing ten bicycles in a nose to tail orientation.

FIG. 4 is a schematic illustration in which bicycles 25 located on the left hand side, namely 25*a*, 25*b*, 25*c*, 25*d* and 25*e* are each positioned nose in first and bicycles 26 located on the right hand side, namely 26*a*, 26*b*, 26*c*, 26*d* and 26*e* are each positioned tail in first. By arranging the bicycles in this manner, the chain from the pedals to the back wheel is located toward or under the rail on both the left and right hand sides of the assembly. In other words, the chain of the bicycles is not located on the outside of the bicycles loaded on each assembly.

The bicycles 25 and 26 on each assembly are positioned nose to tail, and in addition, the bicycles on all of the adjacent assemblies, for example bicycles 26*a* to 25*b*, 26*b* to 25*c*, 26*c* to 25*d*, and 26*d* to 25*e* are all positioned nose to tail to each other.

Figure 5:
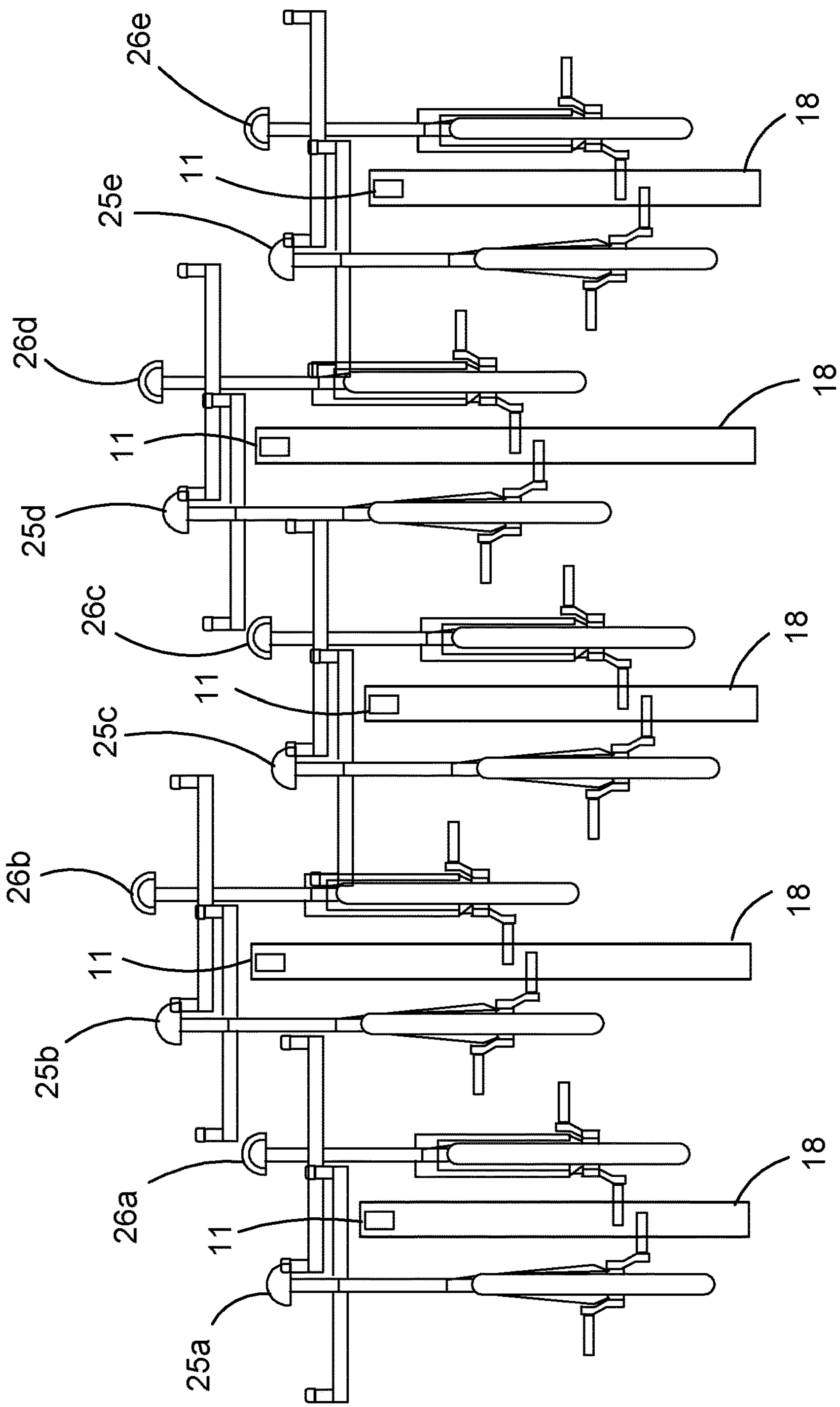
FIG. 5 is a schematic elevation view of the installation shown in FIG. 4 in which the consecutive assemblies are located at alternating heights.

FIG. 5 is a side elevation of the installation shown in FIG. 4 in which consecutive rails 11 are arranged at different heights, and suitably arranged in alternating heights. For example, the first rail 11*a* is located at a first height which is greater than the height of the second rail 11*b*, and the third rail 11*c* is located at the same height as the first rail 11*a*. The rails 11*a*, 11*c* and 11*e* are all located at the same height, and rails 11*b* and 11*d* are all located at the same height. The difference in height between adjacent rails may be any suitable height, and may for example, be in the range of 20 to 30 cm.

The net effect of the nose-to-tail relationship between bicycles on the same rail 11 and the nose-to-tail relationship between adjacent bicycles on adjacent rails, is that bicycles arranged in the same orientation, for example nose in first, and located at the height are spaced apart by three bicycles. For example with reference to FIG. 5, bicycle 25*a* of rail 11*a* is located at the first height with the nose of the bicycle in first, and bicycle 25*c* is the next bicycle at the same height and arranged with its nose in first. Bicycle 25*a* is spaced from bicycle 25*c* by bicycles 26*a*, 25*b* and 26*b*. Similarly, bicycles 26*a* located at the first height with the rear of the bicycle located in first, is spaced from bicycle 26*c* in the same orientation, by bicycles 25*b*, 26*b* and 25*c*. The main benefit this provides is clashing of handle bars, peddles and so forth, between bicycles located in the same orientation is minimized.

It will be understood to persons skilled in the art of the invention that many modifications may be made without to the preferred embodiment described herein without departing from the spirit and scope of the invention.

For example although not shown in the figures, it is possible that the spacing between the support brackets 16, for example, the spacing between the support brackets 16*a* and 16*b* may be adjustable to cater for bicycles of different sizes. The adjustability may for example be provided by the brackets 16 being slidable mounted along the cantilever member 15. Similarly, the spacing between the support brackets 16*c* and 16*d* may also be adjustable to cater for bicycles of different sizes.

The invention claimed is:

1. An assembly for storing two bicycles each having a front wheel, a rear wheel, and a frame that has a seat post with a seat and a goose neck that is connected to the front wheel and handle bars, the assembly including:

at least one fixed rail; and a support frame on which the bicycles can be loaded in an elevated position above the ground with one of the bicycles on opposite sides of the fixed rail, wherein the support frame has a carriage that is arranged to travel along the rail that allows the support frame to move between a forward advanced position for loaded and unloading the bicycle from the support frame, and a rearward retracted position for storing the bicycle, and the support frame is configured so as to protrude beyond the rail when the support frame is located in the forward advanced position which facilitates a user loading the bicycle onto the support frame without obstruction from the rail, and wherein the support frame has support brackets that are fixedly connected to opposite sides of the support frame and extend outwardly at a forward end and at a rearward end of the support frame, wherein the support brackets include:

first support brackets that are fixed on opposite sides of the support frame, and the first support brackets extend above the rail and receive the goose neck of the bicycles so that the handle bars rest on the first support bracket with the handle bars above the rail, second support brackets that are fixed on the opposite sides of the support frame, and receive the seat post so that the underside of the seats of the bicycles rest on the second support bracket, and in which the support brackets at the forward end of the support frame are at different heights to each other, and the support brackets at the rearward end of the support frame are at different heights to each other for minimizing the likelihood for bicycles to clash.

2. The assembly according to claim 1, wherein the support frame is configured so that when in the rearward retracted position, the bicycle loaded onto the support frame is located at least partly alongside the rail.

3. The assembly according to claim 1, wherein the support frame protrudes beyond the rail by a first distance, when in the forward advanced position, that is at least equal to either: i) the length from the back of a rear wheel to the stem of the goose neck, or ii) the length from the front of the front wheel to the seat post.

4. The assembly according to claim 3, wherein the support frame can move by a second distance between the forward advanced position and the retracted position along the rail in which the second distance is at least equal to the first distance.

5. The assembly according to claim 1, wherein the support frame is configured so that the at least one bicycle loaded onto the support frame is supported in an upright orientation in which the wheels of each bicycle are substantially level.

6. The assembly according to claim 1, wherein the support frame includes a cantilever member, one end of the cantilever member extends from the carriage, and support brackets on which the bicycle can be loaded in a stable condition are arranged on the cantilever member.

7. The assembly according to claim 6, wherein the cantilever member protrudes beyond the rail when the support frame is located in the forward advanced position.

8. The assembly according to claim 6, wherein on one side of the cantilever member, the first support brackets are at the rear end of the support frame, and second support brackets are at a forward end of the support frame, and on an opposite side of the cantilever member, the first support brackets are at the forward end of the support frame, and the second support brackets are adapted to support the seat of the bicycle at a rear end of the support frame, the first and second support brackets thereby enabling bicycles to be located on opposite sides of the cantilever member in a nose to tail relationship to each other.

9. The assembly according to claim 8, wherein the second support brackets are arranged to support the seat of the bicycle below the handle bars.

10. The assembly according to claim 8, wherein the first and second support brackets each include one pair of arms that are spaced to receive therebetween either i) the seat post to allow an underside of the seat to rest in the arms, or ii) a stem of a goose neck of the bicycle to allow the handle bars to rest on the arms.

11. The assembly according to claim 1, wherein the support frame includes a handle at a forward end of the support frame that extends upwardly of the rail for manually moving the support frame between the forward advance and the rearward retracted positions.

12. The assembly according to claim 1, wherein the assembly includes at least one upwardly extending post that can be anchored to the ground and the rail can be connected to the post to mounted rail at a height in the range of the 80 to 140 cm above the ground.

13. The assembly according to claim 12, wherein the assembly includes a bracing element that extends at an angle between the post and the ground for bracing the post against sideways movement.

14. The assembly according to claim 1, including a plurality of the rails, each rail having one of the support frames and, wherein the rails are arranged side-by-side and adjacent rails are located at different heights, and at alternating heights.

15. An installation including the assembly according to claim 1, wherein the installation has a plurality of the rails arranged in series, each having the support frame thereon, and wherein consecutive rails are located at alternating heights.

16. The installation according to claim 15, wherein the spacing between adjacent rails is in the range of 40 to 60 cm.

17. An assembly for storing two bicycles each having a front wheel, a rear wheel, and a frame that has a seat post with a seat and a goose neck that is connected to the front wheel and handle bars, the assembly including:

at least one fixed rail; and a support frame on which the bicycles can be loaded in an elevated position above the ground with one of the bicycles on opposite sides of the fixed rail, wherein the support frame has:

i) a carriage that is arranged to travel along the rail that allows the support frame to move between a forward advanced position for loaded and unloading the bicycle from the support frame, and a rearward retracted position for storing the bicycle, and the support frame is configured so as to protrude beyond the rail when the support frame is located in the forward advanced position which facilitates a user loading the bicycle onto the support frame without obstruction from the rail, ii) a cantilever member extending from the carriage in a direction parallel to the rail, wherein the cantilever member has fixed support brackets extending outwardly in opposite directions at a rear end of the cantilever member and a forward end of the cantilever member, in which the support brackets include first support brackets having a pair of arms that are spaced to receive the goose neck of the bicycle so the handle bars rest on the arms with the handle bars located above the rail, and second support brackets have a pair of arms that are spaced to receive the seat post so the underside of the seat rests on the arms, wherein the first and second support brackets are located on opposite sides at the forward end of the cantilever member, and at opposite side of the rearward end of the cantilever member, whereby in use, the bicycles are loaded in a nose to tail arrangement with the handle bars above the rail, and iii) a handle at a forward end of the support frame that extends above the rail in a fixed position relative to the rail for manually moving the support frame between the forward advance and the rearward retracted positions.

* * * * *